July 27, 1948.  W. FIORE  2,445,769
RECTIFIER AND ASSEMBLY
Filed Nov. 6, 1942  4 Sheets-Sheet 1
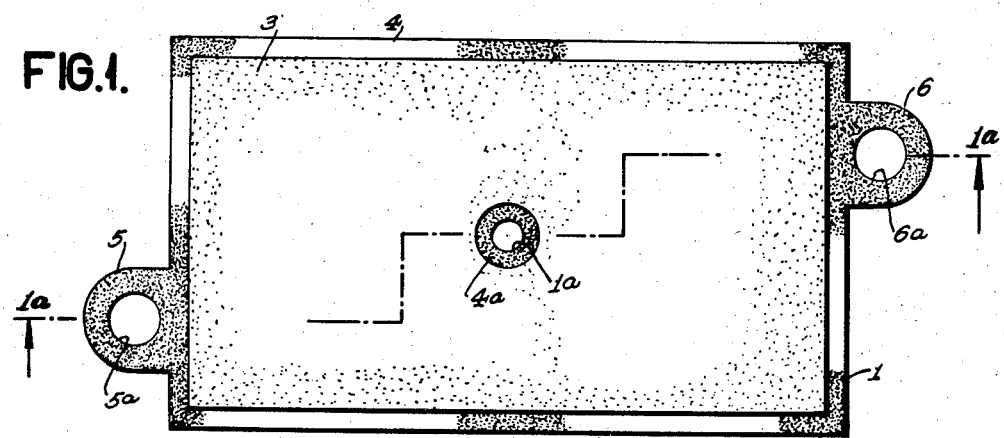
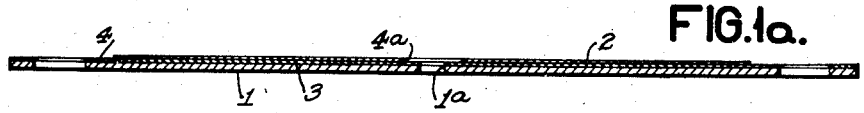
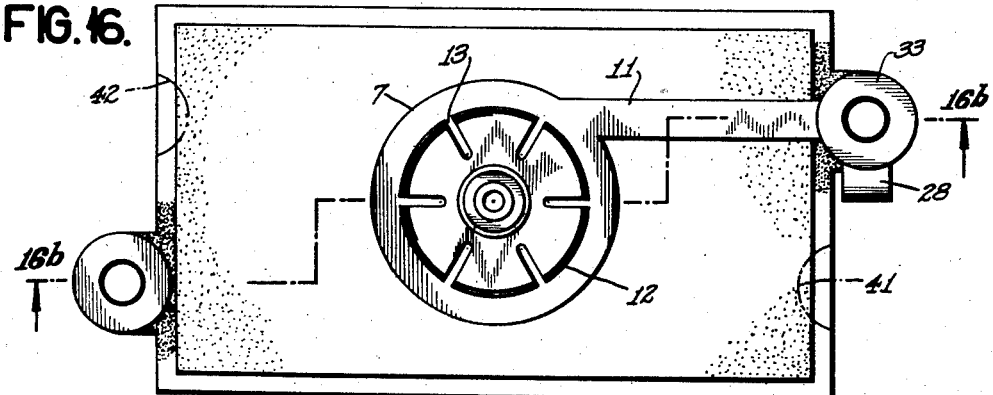
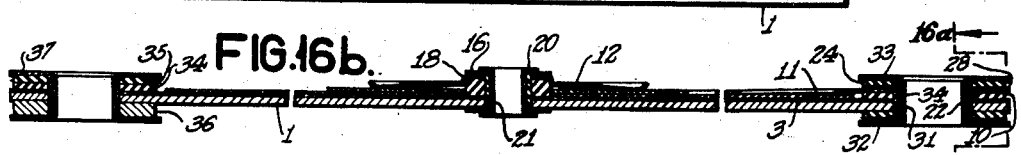
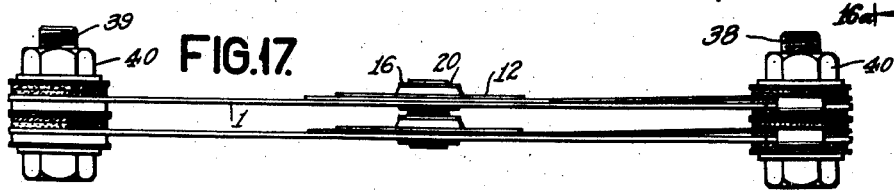
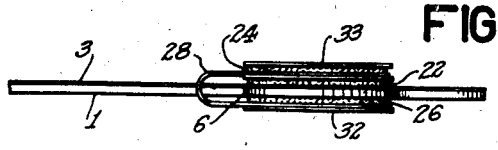
INVENTOR.
WILLIAM FIORE
BY
D. J. Angus
ATTORNEY July 27, 1948. W. FIORE 2,445,769
RECTIFIER AND ASSEMBLY
Filed Nov. 6, 1942 4 Sheets-Sheet 2
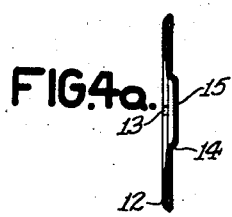
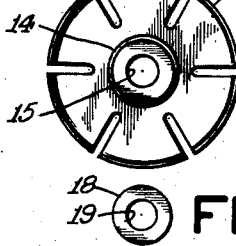
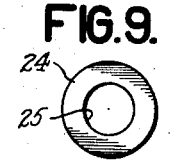
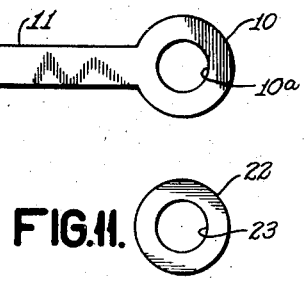
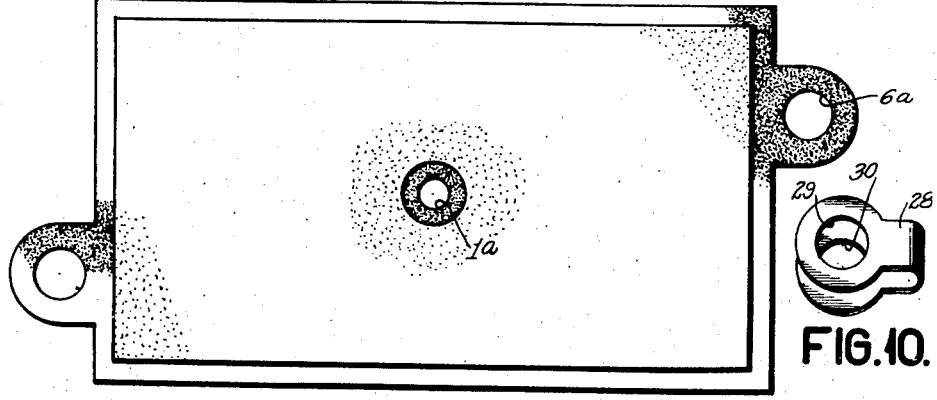
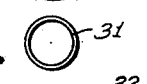
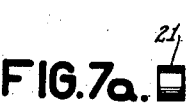
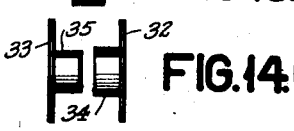
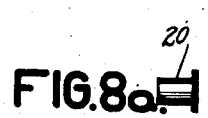
INVENTOR.
WILLIAM FIORE
BY
D. G. Angus
ATTORNEY July 27, 1948.
W. FIORE
2,445,769
RECTIFIER AND ASSEMBLY
Filed Nov. 6, 1942
4 Sheets-Sheet 3
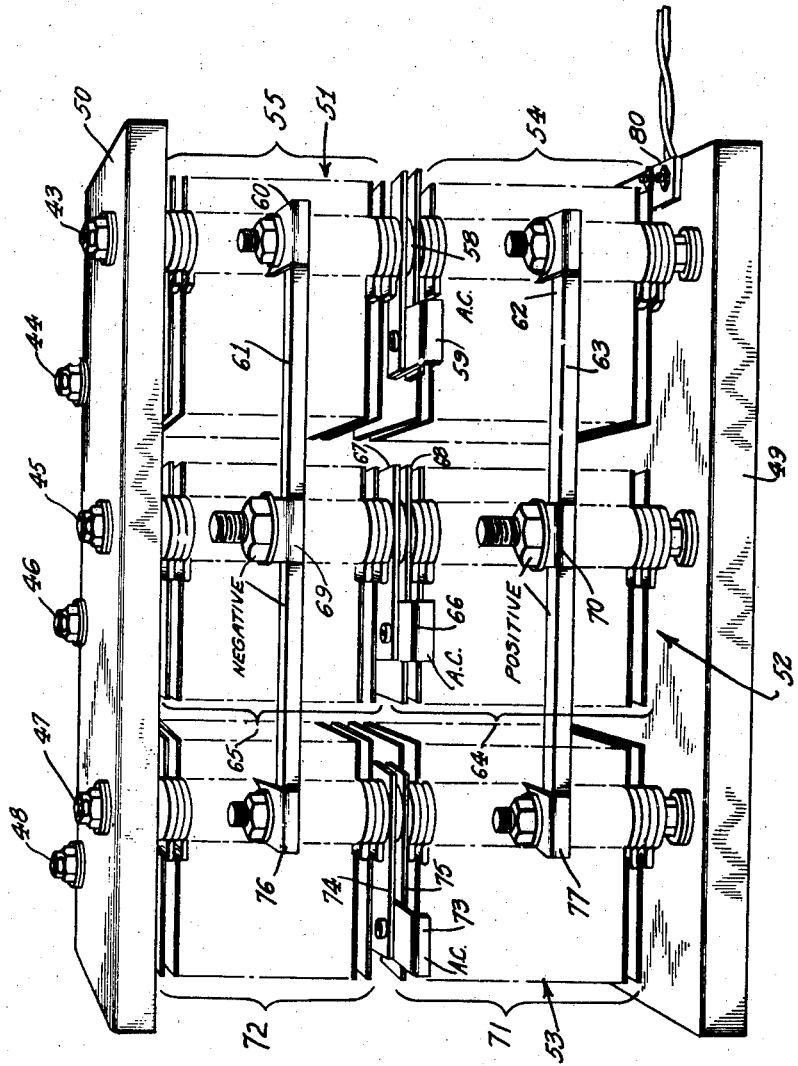
INVENTOR.
WILLIAM FIORE
BY
ATTORNEY July 27, 1948.  W. FIORE  2,445,769
RECTIFIER AND ASSEMBLY
Filed Nov. 6, 1942  4 Sheets-Sheet 4

INVENTOR.
WILLIAM FIORE
D. G. Angus
ATTORNEY

Patented July 27, 1948

2,445,769

UNITED STATES PATENT OFFICE 2,445,769

RECTIFIER AND ASSEMBLY

William Fiore, Brooklyn, N. Y., assignor to Federal Telephone & Radio Corporation, New York, N. Y., a corporation of Delaware Application November 6, 1942, Serial No. 464,748

3 Claims. (Cl. 175—366)

This invention relates to rectifier units of the metal plate type and to stacks of said units. The object is to provide an assembly arrangement for a rectifier unit which is light, simple and capable of carrying relatively high current. A related object is to provide an assembly arrangement such that a number of units can be easily stacked compactly while leaving sufficient space for cooling fluid to flow between the individual units.

In metal plate rectifiers it is the usual practice to coat a base plate such as iron or aluminum with an active material such as selenium which is a semi-conductor and then to put a counter-electrode over the active material. The terminals for the unit are the base plate itself and the counter-electrode. It has been a problem to make a satisfactory contact with the counter-electrode of large rectifier elements particularly where heavy current carrying capacities are required. The difficulty is due in part to the fact that excessive or concentrated pressure exerted on the surface of the very thin counter-electrode coating, to achieve good electrical contact of low ohmic resistance, may cause a fracture of the electrode coating resulting in a short circuit of the barrier layer. The barrier layer is formed between the surfaces of the counter-electrode and the selenium layer. Its thickness may vary between $10^{-4}$ and $10^{-6}$ mm. Further, a satisfactory contact to the counter-electrode must have a support for itself and the rectifying element.

In accordance with my invention there is provided an efficient simple contact to the counter-electrode together with effective means for making connection to it. This is done by placing a metal contact plate of relatively large area against the counter-electrode surface and holding it there by means of a spring member the tension of which is supplied by suitable riveting means or the like connected with the base plate itself. A feature is the provision of supports which not only support the unit but also support the terminal connections, with provision for the insulating of the counter-electrode contact from the base connection. This mounting arrangement is such that when a number of the rectifier units are stacked as for a parallel electrical connection there is provided a proper spacing between adjacent units so that air or other cooling fluid can be made to pass between them.

The invention will be understood from the following detailed description and the accompanying drawing of which Fig. 1 shows a plan view and Fig. 1a a side view in section taken along line 1a—1a of Fig. 1, of a rectifier element;

Figs. 2 to 15, inclusive, shows details of elements used in the assembly, Fig. 2 being the rectifier element, Fig. 3 being a contact member, Figs. 4 and 4a showing a spring member, Fig. 5 showing an insulating washer, Fig. 6 showing another insulating washer, Figs. 7 and 7a showing an insulating sleeve, Figs. 8 and 8a showing a binding rivet, Fig. 9 showing another insulating washer, Fig. 10 showing a fusible element, Fig. 11 showing another insulating washer, Fig. 12 showing an insulating washer, Figs. 13 and 13a showing an insulating sleeve, Figs. 14 and 14a showing a binding rivet, and Fig. 15 showing another insulating washer.

Figs. 16 and 16a and 16b show an assembly of the rectifier unit, Fig. 16a being an end view and Fig. 16b being a side view in section taken at line 16b—16b of Fig. 16.

Fig. 17 shows an assembly of a number of the rectifier elements shown in Fig. 15;

Figure 19:
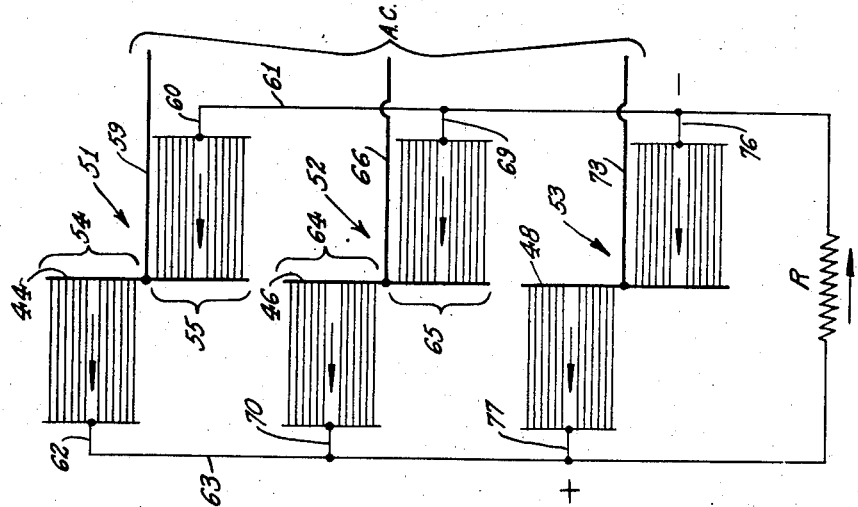
Fig. 19 shows the electrical circuit arrangement of the assembly stack illustrated in Fig. 18.

The rectifier element shown in Figs. 1 and 1a is built on a base plate 1 which may be of well-known material such as nickel plated steel or aluminum. The base plate is provided with a centrally located hole 1a. On the base plate there is placed a layer 2 of the active material such as selenium which may be applied to one or both sides of the plate in any well-known manner, as for example by melting amorphous selenium and spreading it in molten condition over the surface or surfaces of the base plate and then allowing it to cool and solidify.

While the description of my invention concerns itself with base plates that are coated on one side only for simplicity of description, it is to be understood that both sides of the base plate could be coated forming rectifying elements on both surfaces in the well-known manner.

The fusing of the selenium on the plate should be followed by the well-known annealing process to crystallize the selenium to place it in the proper semi-conducting condition for use as a rectifier. This annealing process may be carried out, for example, by heating the selenium-coated disk for some time such as several hours at a temperature between 100° C. and the melting point of selenium which occurs at about 219° C. After the annealing, the counterelectrode 3 is sprayed over the surface of the selenium by a suitable spray process. A suitable counterelectrode substance is Wood's metal, for example. The counterelectrode should not be made to cover the entire surface of the selenium but instead, there should be left margins 4 and 4a around the counterelectrode so that the counterelectrode will not short circuit to the base plate around the edges of the selenium.

To carry out the assembly arrangement according to this invention the base plate 1 is provided at its end with a pair of ears 5 and 6 formed integrally with the base plate. These are provided with holes 5a and 6a respectively. In Figs. 2 to 15, inclusive, there are shown details of the elements used in the assembly of a rectifier unit and these figures also indicate the relationships of the elements in the assembly so as to create the assembly arrangement of Figs. 16, 16a and 16b. In the assembly arrangement the contact plate 7 shown in Fig. 3 is laid over the middle of the counterelectrode as shown in Fig. 16. This contact plate comprises an enlarged portion 8 having a hole 9 in the center adapted to be placed over the hole 1a of the base plate. The area 8 is connected to a terminal portion 10 by means of conducting band 11. Terminal portion 10 has a hole 10a in it adapted to register with the hole 6a of the base plate 1. There is placed over the enlarged portion 8 a spring member 12 as shown in Figs. 4 and 4a. This may be of any suitable metal such as brass or aluminum and is provided preferably with radial slots 13 to facilitate the spring action. At the center there is a raised boss 14 having central hole 15 adapted to register with the holes 1a and 9.

Over the boss 14 there is placed an insulating washer 16, shown in Fig. 5. This has a similar hole 17 also adapted to register with hole 1a. There is placed under boss 14 another washer 18 (Fig. 6) also having a similar hole 19 registering with hole 1a. Washer 18 is of the proper thickness to fit under boss 14 and through hole 9 of member 7. The assembly of these parts is shown in Fig. 16b. They are held together by means of a rivet 20 (Figs. 8 and 8a) adapted to pass through the hole 1a in the base plate and all the registering holes of the above mentioned elements placed over it. In order to insulate the base plate 1 from the contacting member 7 there is provided an insulating sleeve 21 (Figs. 7 and 7a) adapted to pass through the holes of the registering elements between the elements and the binding rivet 20 so that when the rivet is riveted down this insulating sleeve is between the rivet and the elements through which the rivet passes. To prevent the under head of the rivet from contacting the base plate 1, an insulating washer 21a having a hole 21b (Fig. 15) is placed over the rivet between the rivet head and the base plate. The riveting process is sufficient to cause the spring member 12 to flatten down against the surface of contact plate 8 and make a good tight contact against the counterelectrode without exerting so much pressure as to cause cracking of the selenium or counterelectrode.

The terminal end 10 of contact plate 7 is mounted over ear 6 by the elements shown in Figs. 9 to 14a inclusive, the assembly being shown in Figs. 16a and 16b. An insulating washer 22 (Fig. 11) such as fiber, having a hole 23 through it is placed over ear 6, so that hole 23 registers with hole 6a; then the terminal member 10 is laid over washer 22. Over the terminal member 10 there is placed another insulating washer 24 (Fig. 9) having a hole 25 in it adapted to register with hole 6a; and underneath the ear 6 there is placed another insulating washer 26 (Fig. 12) having a hole 27 adapted to register with hole 6a. Preferably, although not necessarily, there is provided a fuse so that in case of excessive current the fuse will break the circuit. This may be done by use of the fusing member 28 shown in Fig. 10. This comprises a strip of foil or the like which melts when the allowable current is exceeded. This has a pair of holes 29 and 30 in its respective ends adapted to register with the hole 6a. The end having hole 29 is placed in contact with the terminal member 10 and the other end having hole 30 is placed beneath the insulating member 26. An insulating sleeve 31, such as rubber (Figs. 13 and 13a) is placed through the holes 25, 10a, 29, 6a, 27, 23 and 30 so as to prevent short circuiting of contact 7 to the base plate 1. These terminal elements are bound together by riveting means shown in Figs. 14 and 14a. This comprises a pair of flanges 32 and 33 having shanks 34 and 35 respectively which fit one within the other. These may be pressed together and crimped from inside the hole to constitute a firm terminal supported by ear 6. The binding rivets thus become the terminal element.

The opposite terminal of the rectifier element at ear 5 is arranged in a somewhat similar manner (see Fig. 16b). A pair of insulating washers 34 and 35 are placed over the ear 5 with holes registering with hole 5a, and underneath the base plate 1 there is placed a conducting washer 36 also having registering hole. A terminal riveting device 37 similar to that shown in Figs. 14 and 14a is then applied to clamp the members together and form a compact tight terminal element supported by ear 5. In this terminal no rubber sleeve is used because it is desired to have the base plate 1 connected directly to the terminal member 37. This is accomplished through the metallic washer 36.

If desired a fusing member could be placed at ear 5 in addition to that at ear 6. This could be done for example by insulating the terminal member 37 from the base plate 1 by means of a rubber sleeve such as shown in Fig. 13, and by replacing the metallic washer 36 by an insulating washer. A fusible element such as strip 28 of Fig. 10 could then be connected with one end in contact with one of the flanges of element 37 and the other end in contact with the base plate 1.

Fig. 17 shows how the construction of the unit facilitates the assembly in a stack arrangement of a number of the rectifier assemblies of Figs. 16 and 16b. Bolts 38 and 39 are passed through the respective holes of terminal members 32 and 37. The rectifier units should be arranged so that all of ears 5 are on one bolt and all of the ears 6 on the other bolt, so that the current will flow in the same direction through all of the elements in the stack from one bolt to the other. After the desired number of rectifying units have been stacked on the bolts, nuts such as 40 may be tightened down. In this way a good electrical contact is made between each terminal member on the respective bolts; and the rectifying units are electrically in parallel with each other. Suitable connectors can be mounted on the bolts in contact with one or more of the terminal member of the units.

Owing to the presence of the washers and the rivets at the terminals, the rectifying plates of the units are spaced apart by a sufficient degree to allow cool air or other fluid to be blown between the plates to provide cooling. By this arrangement any number of plates may be connected in parallel to provide a heavy current flow and adequate cooling may be provided. The arrangement shown in Fig. 17 provides a half-wave rectifier as the connections on bolts 38 and 39 provide the two terminals; but it will be understood that this method of stacking readily lends itself to other kinds of electrical connection. Either a half-wave rectifier, a full wave rectifier, a 3-phase bridge rectifier or any other desired type of rectifier connection may be had.

Figure 18A:
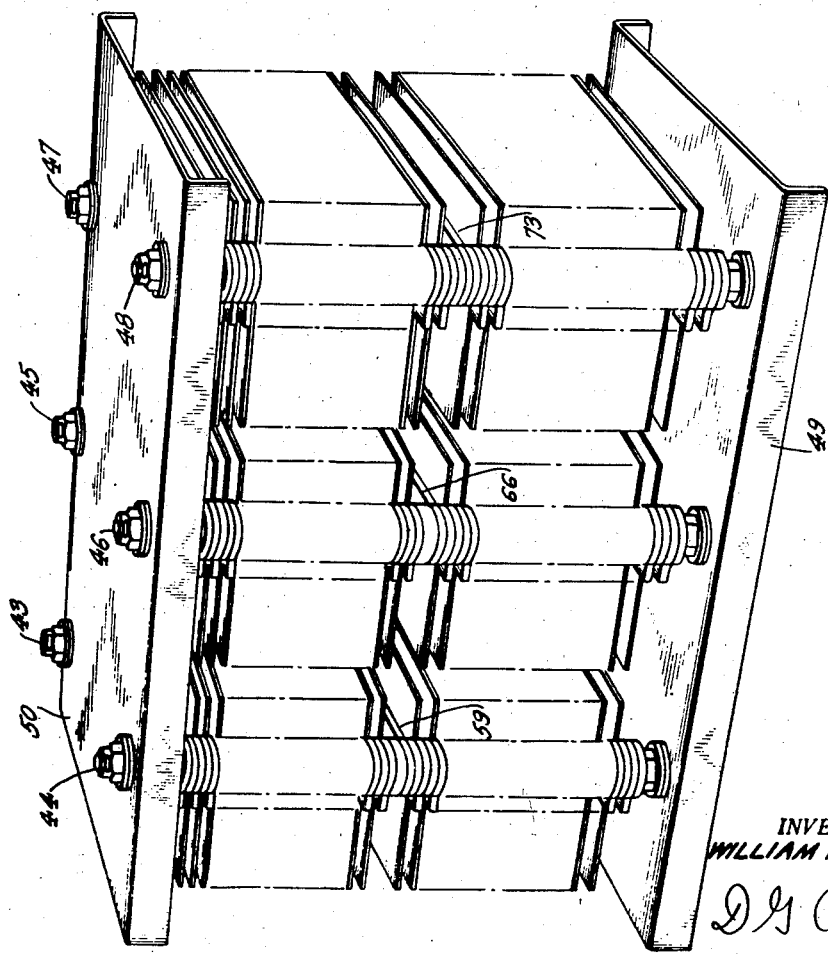
Figs. 18 and 18 show a stacking arrangement for the rectifier elements of Fig. 16.

For example Figs. 18 and 18a show a stacking arrangement for operation from a three-phase alternating current power source. In this arrangement the rectifier is mounted on six mounting bolts 43 to 47 inclusive. The bolts are mounted on a base plate 49 and are held by a top plate 50 as shown. In this arrangement the rectifiers are arranged in three stacks, one being mounted on bolts 43 and 44, the second on bolts 45 and 46, and third on bolts 47 and 48. Owing to the fact that this is a three-phase arrangement the bolts themselves are insulated from the rectifier terminals. This may readily be done by wrapping a sleeve of insulation around each bolt to keep the bolt electrically insulated from the terminal members. Each of the three stacks is arranged to have two sets of rectifying units. The first stack, mounted on bolts 43 and 44, comprises the set 54 and the set 55 of rectifying units, the units of each set being connected in parallel. Each set is shown to have 16 units although it will be understood that the number of units may be varied at will. The set of units 54 is separated from set 55 by means of insulating members 56 and 57 which themselves are separated by a washer 58. The members 56 and 57 are adapted to hold the terminal bar 59 which is one of the A. C. terminals of the assembly, this passing through to the rear of the stack and connecting with the terminals on bolt 44 as shown in Fig. 18a. A terminal lug 60 is brought out from some suitable position of contact with group 55 and bolted to a bus bar 61 which will be the negative direct current bus bar. Similarly, a terminal lug 62 is brought out from the terminals of group 54 and bolted to the bus bar 63 which is the positive D. C. bus bar.

The middle stack is likewise divided into two parts 64 and 65, the part 64 being connected to the positive bus bar 63 by means of lug 70 and the upper part 65 being connected to the negative bus bar 61 by the lug 69. In a similar fashion the third stack is divided into two parts 71 and 72, the part 71 being connected to the positive bus bar by lug 77 and the part 72 being connected to the negative bus bar by lug 76.

From the wiring diagram, Fig. 19, it can readily be seen that there is connected to each alternating current bus bar 59, 66 and 73 a stack of 32 rectifier units arranged in two groups, each group comprising 16 units in parallel. For example, the bus bar 59 has connected to it the group 54 of 16 units in parallel and the group 55 of 16 additional units in parallel, group 54 being connected at its opposite side to the positive D. C. bus bar and group 55 to the negative D. C. bus bar. The polarity of each group is such that the current flows from one of the groups to the other through the alternating current terminals at bolt 44 in the same direction, as indicated by the arrows of current flow.

A rectifier arrangement such as this can easily be made to handle relatively large amounts of power, for example the rectifier assembly shown in Figs. 18 and 18a has been made to produce an output of about 200 amperes at 30 volts through the direct current load R. The heat developed in the rectifier stack can easily be dissipated by blowing air through the stack, between the units. Protection for the rectifier can easily be had by means of a thermocouple connected to the hottest plate, this being indicated by the thermocouple 80 which may be had to operate a meter or a circuit breaker if desired.

A modification of the stacking arrangements illustrated can be had by providing the base plate 1 with arcuate cutouts as indicated by the broken lines 41 and 42 in Fig. 16. This will permit interleaving the units of two stacks into each other, causing them to occupy the same base space as one stack would occupy. This can be done by arranging the supporting bolts of the two stacks close together, one diagonal pair of bolts serving to pass through the terminal members of the other stack. Each bolt, while passing through the holes of its own terminal member, will lie within the corresponding arcuate cutout of the units to which they are not connected; and due to the cutouts the bolts passing within them will not make contact with them. The provision of the fusing member 28 in connection with each individual rectifying unit has the advantage that even though one or more of the fuses break or melt, the entire rectifier assembly will not be put out of operation, as the only parts put out of operation will be those on which the fuses melt.

The particular stacking arrangements illustrated need not necessarily be followed in all cases for it will be easily recognized that in the light of the conception shown other stacking arrangements will suggest themselves.

What is claimed is:

1. A dry disc rectifier including a base plate having a coating of rectifying material and a counter-electrode on said coating, a connection for said counter-electrode including an apertured ear extending beyond one edge of said plate, conductive mounting means passing through said ear but being insulated therefrom, and a fuse element formed as two metallic ears and a fusible member interconnecting said ears, both said fuse ears being traversed by said mounting means, only one of said fuse ears making contact with the ear of said connection, and the other ear making contact with said mounting means, whereby said counter-electrode is individually fused.

2. A dry disc rectifier including a base plate having a central aperture therethrough, and provided with an apertured mounting ear extending from one edge thereof, a layer of rectifying material coating said plate over the greater portion of the surface of at least one side thereof, a counter-electrode covering substantially all said rectifying layer, a generally circular conducting plate arranged in contact with said counter-electrode and covering only a limited area thereof surrounding said central aperture, said contact plate being provided with a central aperture registering with the central aperture in said base plate and having an integrally formed relatively narrow connection strip extending to said mounting ear, the end of said connection strip being apertured to register with the aperture in said mounting ear, a circular radially-split spring member provided with a raised central boss and a hole therethrough registering with said aperture in said base plate and covering a substantial portion of said contact plate, and fastening means extending through all registering central holes and apertures of the individual members recited, whereby said spring member forces said contact plate against said counter-electrode over substantially the entire area of said contact plate, so as to reduce contact resistance between said counter-electrode and said contact plate, and whereby the electrical circuit to said counter-electrode is independent of said spring member, and an integral metallic path without intermediate contacts extends from said contact plate to the farther end of said connection strip, so that thermal and pressure displacements of said spring member and said fastening means do not affect the current flow path between said counter-electrode and the outer end of said connection strip.

3. Rectifier according to claim 2, and including conductive mounting means passing through the registering apertures of said mounting ear and said connection strip being insulated therefrom, and a fuse element formed as two metallic ears and a fusible member interconnecting said ears, both said fuse ears being transversed by said mounting means, only one of said fuse ears making contact with the ear of said connection strip and the other ear making contact with said mounting means, whereby said counter-electrode is individually fused.

WILLIAM FIORE.

REFERENCES CITED

The following references are of record in the file of this patent:

UNITED STATES PATENTS

| Number | Name | Date |
| --- | --- | --- |
| 2,134,131 | Kippan | Oct. 25, 1938 |
| 2,172,200 | Hein | Sept. 5, 1939 |
| 2,221,616 | Smith | Nov. 12, 1940 |

FOREIGN PATENTS

| Number | Country | Date |
| --- | --- | --- |
| 318,265 | Great Britain | Dec. 1, 1930 |